United States Patent [19]
Gillan et al.

[11] 3,878,148
[45] Apr. 15, 1975

[54] FILM-FARMING COMPOSITIONS COMPRISING AUTOXIDIZABLE MATERIAL

[75] Inventors: John Gillan, Noble Park, Victoria; Livia Polgar, Caulfield, Victoria, both of Australia

[73] Assignee: Delux Australia Ltd., Melbourne, Victoria, Australia

[22] Filed: Sept. 20, 1973

[21] Appl. No.: 399,274

[30] Foreign Application Priority Data
Sept. 28, 1972 Australia................ 636/72

[52] U.S. Cl. ...... 260/22 EP; 117/124 E; 117/161 K; 260/18 EP; 260/32.6 R; 260/33.6 R
[51] Int. Cl. ............................................ C09d 3/66
[58] Field of Search ........ 260/22 EP, 18 CL, 18 EP, 260/404.8

[56] References Cited
UNITED STATES PATENTS

| | | | |
|---|---|---|---|
| 2,423,230 | 7/1947 | Eilerman............................ | 106/252 |
| 2,444,328 | 6/1948 | Blair ................. | 260/404.8 |
| 2,988,524 | 6/1961 | Fitch................. | 260/22 EP |
| 3,253,938 | 5/1966 | Hunt.................. | 260/23 R |
| 3,366,563 | 1/1968 | Hart et al.......................... | 260/22 R |
| 3,404,018 | 10/1968 | Hicks .............................. | 260/22 EP |
| 3,459,715 | 8/1969 | Gaertner........................ | 260/18 CL |
| 3,485,732 | 12/1969 | D'Alelio............................ | 260/404.8 |
| 3,649,570 | 3/1972 | Boehringer ....................... | 260/404.8 |
| 3,699,064 | 10/1972 | Cunningham.................... | 260/22 EP |
| 3,758,427 | 9/1973 | Katsibas........................... | 260/18 EP |
| 3,770,675 | 11/1973 | Taft................................. | 260/22 EP |

*Primary Examiner*—Ronald W. Griffin
*Attorney, Agent, or Firm*—Cushman, Darby & Cushman

[57] ABSTRACT

Novel film-forming compositions are disclosed which are useful in preparing paints of unusual through-drying potential. The novel compositions comprise autoxidizable esterification residues of unsaturated fatty acids and at least one moiety per molecule of the structure

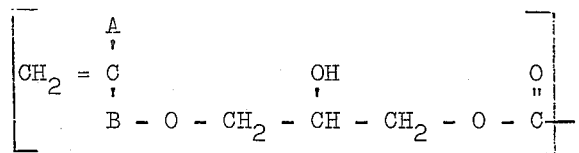

wherein A is H or $Ch_3$ and B is $-CH_2-$ or

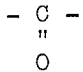

6 Claims, No Drawings

FILM-FARMING COMPOSITIONS COMPRISING AUTOXIDIZABLE MATERIAL

This invention relates to novel film-forming compositions.

It is well known that when certain liquid materials such as the so-called drying oils are deposited as a film on a substrate and exposed to contact with air, they spontaneously react with atmospheric oxygen to form useful solid, tough, integrated, polymeric coating films on the substrate. Materials having this characteristic are commonly referred to as autoxidizable film-forming materials. The drying oils themselves have certain inherent limitations when used as film-forming compositions, for example, their relatively slow rate of conversion from liquids to solid films, and many synthetic film-forming polymer systems comprising autoxidizable moieties have been developed in order to overcome these deficiencies. Typical of this type of development are the oil-modified alkyd resins which comprise autoxidizable residues of drying or semi-dryingoil fatty acids.

We have now devised a further class of novel autoxidizable film-forming compositions which are characterised, in particular, by very fast through-dry and resistance to wrinkling when applied as films to substrates, the resistance to wrinkling being especially noticeable when relatively thick films are tested. These novel compositions are autoxidizable film-forming materials which comprise autoxidizable esterification residues of unsaturated fatty acids and at least one moiety per molecule with a structure of the form:

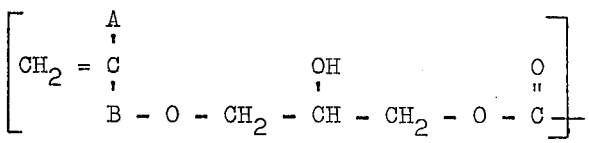

where A is H or $CH_3$
and B is $-CH_2-$ or

Coating compositions comprising a novel autoxidizable film-forming polymer as hereinabove defined may be used to form clear coatings on substrates and may optionally be pigmented in conventional manner by the dispersion therein of insoluble pigment particles to provide protective and/or decorative paints.

The film-forming compositions according to the invention may, for example, be prepared by reacting autoxidizable film-forming materials comprising esterification residues of unsaturated fatty acids and free carboxyl groups, with certain polymerizable monomers which comprise both one epoxy group and one ethylenic double bond per monomer molecule under such conditions that the carboxyl groups of the film-forming material will react with the epoxy groups of the monomer, but such that no polymerisation will occur.

The nature of such autoxidative film-forming material is not critical to the performance of this invention and it may be selected from a wide range of materials, bearing in mind the requirement that it must contain free carboxyl groups. The material may be, for example, a drying or semi-drying oil which has been reacted with maleic anhydride, the maleic anhydride being subsequently partially hydrolyzed to give free carboxyl groups. The oil may be a triglyceride oil of the type well known and used in the art, for example, linseed, tung, fish, safflower, soya and sunflower oils, or it may be an autoxidizable fatty acid ester of a polyol such as pentaerythritol, dipentaerythritol or tripentaerythritol. The fatty acid may be a mixture of acids derived from one of the above oils and known to the art as, for example, tung, linseed, safflower, soya or sunflower fatty acids, or it may be a segregated oil such as, for example, linolenic, linoleic or tall oil fatty acids. The maleinization of oils is a process that is well known in the art and we prefer that the autoxidizable material comprising free carboxyl groups comprises 4–20% by weight of combined maleic anhydride.

Alternatively, the autoxidative film-forming material comprising free carboxyl groups may be a drying oil-modified alkyd resin, the drying oils being of the above described type. The required carboxyl groups may be present in the alkyd resin as unreacted portions of one of the constituents from which the alkyd resin was prepared, or they may be introduced by, for example, reacting an acid anhydride with a hydroxyl group of an alkyd resin to form an acid-ester of the anhydride. For the best results, we have found that the alkyd resin should have a maximum hydroxyl number of 100 and more preferably less than 80. Less satisfactory through-drying is obtained with alkyd resins of higher hydroxyl number. The hydroxyl number, which is defined as the number of mgm of KOH equivalent to the hydroxyl content of 1 gm of the resin, may be determined by, for example, Method D-555 of the American Society for Testing Materials.

The autoxidative film-forming material must contain sufficient carboxyl groups to react with the required number of mol of monomer containing both one epoxy group and one ethylenic double bond per molecule. An excess of carboxyl groups is not required and can, in fact, be a disadvantage if the composition is used in conjunction with acid-reactive pigments.

The most satisfactory alkyd resins with which to prepare compositions according to the invention are those in which the basic alkyd has been condensed to an acid value of 20 mgm KOH per gm. maximum and then sufficient acid anhydride, usually phthalic anhydride, added and reacted with it to raise the acid value to the required stoichiometric value relative to the epoxy groups of the monomer to be reacted therewith. Clearly, the basic alkyd resin must comprise sufficient hydroxyl groups for subsequent reaction with the added phthalic anhydride.

The polymerizable monomer must comprise both one epoxide group and one ethylenic double bond and may be selected from the esters and ethers of glycidol. We have found that glycidyl acrylate, glycidyl methacrylate and allyl glycidyl ether are particularly suited for our purpose, the preferred monomers being glycidyl acrylate and methacrylate.

A composition according to the invention may be prepared by heating the autoxidative film-forming material as hereinabove defined with polymerizable monomer to 120°C with stirring until the acid value of the reaction mixture falls to a predetermined level, thus indicating that the desired amount of reaction has taken place. We have found it desirable to include in the reaction mixture trace quantities of inhibitors to prevent any polymerisation taking place. Suitable inhibitors are, for example, hydroquinone and oxalic acid. The percentage of polymerisable monomer combined with the autoxidative film-forming material may vary from 1 - 30% and more preferably from 2 - 15% by weight of the total weight of the composition.

The novel compositions according to the invention may be incorporated directly into paint compositions either as the sole film former or as a blend with conventional film-forming material. Paint compositions thus-prepared usually exhibit considerable advantages over conventional paints in that they completely throughdry relatively quickly and show remarkable resistance to wrinkling even at very high film builds. Conventional paint ingredients such as pigments and driers may be incorporated in the paint composition in art-recognized quantities in a conventional manner.

The invention is illustrated by the following examples in which all parts are expressed by weight.

EXAMPLE 1

The preparation of a range of compositions comprising maleinised autoxidizable fatty acid esters of dipentaerythritol and glycidyl methacrylate. The preparation of the compositions took place in several stages.

a. Preparation of the dipentaerythritol fatty acids ester.

The following materials were charged into a flask fitted with a stirrer, thermometer and azeotropic distillation condenser.

| | | |
|---|---|---|
| dipentaerythritol | 254 | parts |
| safflower fatty acids | 1680 | " |
| zinc oxide | 1.6 | " |
| xylene | 104 | " |

The ingredients were gradually heated to a maximum temperature of 220°C in a nitrogen atmosphere and water was distilled off. The heating was maintained until the acid value of the resin fell below 1.0 mgm.KOH per gm. The resultant product had an acid value of 0.7 mgm. KOH per gm. and a viscosity as measured by a cone and plate viscometer of 1.0 poise at 25°C. The dipentaerythritol fatty acid ester thus prepared was used in making five compositions according to the invention. The quantities of reactants used were as follows:

Composition No. — Parts

| | (1) | (2) | (3) | (4) | (5) |
|---|---|---|---|---|---|
| dipentaerythritol fatty acid ester | 1200 | 1200 | 1200 | 1200 | 1200 |
| maleic anhydride | 30 | 60 | 90 | 120 | 150 |
| oxalic acid | 1 | 1 | 1 | 1 | 1 |
| toluene | 210 | 225 | 225 | 225 | 210 |
| water | 6 | 11 | 17 | 22 | 28 |
| Armeen DMCD (*) | 1 | 1 | 1 | 1 | 1 |
| glycidyl methacrylate | 44 | 87 | 131 | 174 | 218 |
| xylene | — | 336 | — | — | 312 |
| mineral turpentine | — | — | 325 | 316 | — |

(*) A tertiary amine catalyst. "Armeen" is a registered trade mark.

b. Preparation of maleinized dipentaerythritol fatty acid ester.

The dipentaerythritol fatty acid ester, maleic anhydride and oxalic acid were charged into a flask equipped with stirrer and thermometer. The mixture was heated to 225°C and held there until all of the maleic anhydride had combined with the dipentaerythritol fatty acid ester.

c. Hydrolysis of maleinized dipentaerythritol fatty acid ester.

The preparation from (a) was cooled and the toluene, water and Armeen DMCD added. The mixture was held at 115° - 120°C and the progress of the reaction monitored by infrared spectroscopy. The completion of reaction was signified by the absence from the spectrum of the characteristic anhydride absorption peaks at wave numbers 1,850 and 1,786 cm.$^{-1}$.

d. Preparation of glycidyl methacrylate ester.

Glycidyl methacrylate and xylene were added to the preparation and heated to 115° - 120°C until the acid value had fallen to half that of the preparation prior to glycidyl methacrylate addition, thus indicating complete reaction. The compositions thus formed had the following solids contents by weight and cone and plate viscosities.

| Composition Numbers | (1) | (2) | (3) | (4) | (5) |
|---|---|---|---|---|---|
| Solids content (wt%) | 78 | 67 | 70 | 71 | 59 |
| Viscosity (poise) | 0.9 | 1.6 | 3.4 | 6.9 | 1.7 |

EXAMPLE 2

Preparation of paint compositions from the compositions prepared in Example 1 and comparison with an unmodified oil and a commercial alkyd-based enamel. The following ingredients were blended to form a paint composition in a conventional manner.

| | | |
|---|---|---|
| titanium dioxide | 75.0 | parts |
| composition (from Example 1) | 150.0 | " |
| 3% cobalt naphthenate drier solution | 4.0 | " |
| mineral turpentine | 8.5 | " |

All five of the compositions from Example 1 were made up into paint compositions in this fashion. A 125 micron film of each of the paint compositions was drawn down on a glass panel and allowed to air-dry. The film was tested for:

a. touch dry time
b. time for complete through-dry
c. wrinkling

A film of a paint composition utilising an unmodified dipentaerythritol safflower fatty acid ester and prepared using the above paint formulation was tested in identical fashion. The tests were also applied to a conventional alkyd-based enamel. The results were as follows:

| Film Former | Weight % of Maleic Anhydride | Touch-dry Time (Hr. Mins.) | Through-dry Time (Hrs. Mins.) | Wrinkling |
| --- | --- | --- | --- | --- |
| (1) | 2.5 | 6.00 | 3.00 | Nil |
| (2) | 5.0 | 3.00 | 1.45 | Nil |
| (3) | 7.5 | 3.30 | 1.15 | Nil |
| (4) | 10.0 | 7.00 | 4.45 | Nil |
| (5) | 12.5 | 16.00 | 8.00 | Nil |
| dipentaery-thritol safflower fatty-acid ester | — | 6.00 | 48.00 | Very bad |
| Alkyd-based finish | — | 6.00 | 16.00 | Slight |

The superior properties of the paint compositions prepared from compositions according to the invention are clearly demonstrated here. An interesting feature of the novel paint compositions is that through-dry takes place faster than touch-dry, the reverse of the usual procedure, showing that the films are drying toward and not from the surface.

EXAMPLE 3

Preparation of a linseed oil-modified alkyd resin and its reaction with glycidyl methacrylate to produce a film-forming composition according to the invention.

The following materials were charged to a reaction vessel fitted with a stirrer, thermometer and azeotropic distillation column.

| | | |
| --- | --- | --- |
| linseed oil fatty acids | 241.00 | parts |
| glycerol (98% by wt.) | 115.10 | " |
| phthalic anhydride | 148.00 | " |
| xylene | 26.00 | " |
| zinc oxide | 0.25 | " |

The batch was heated to reflux (208°C) and 34.5 gm water removed. The acid value was then 11.6 mgm.KOH per gm. The batch was cooled, 59.5 parts of phthalic anhydride added and reaction allowed to proceed for 6 hrs at 160°C. It was then cooled and thinned with 90.00 parts of mineral turpentine. At this point, the resin had an acid value of 52 mgm.KOH per gm. and a hydroxyl number of 55.

An addition of 51.0 parts glycidyl methacrylate and 0.2 parts of Armeen DMCD (refer Example 1) was then made and reaction allowed to proceed for 2 hrs at 120°C. The final acid value was 16 mgm.KOH per gm. On dilution with 350 parts mineral turpentine the solution of autoxidizable film-forming polymer had a Gardner-Holdt viscosity of H at 47.6% solids by weight.

EXAMPLE 4

Preparation of a composition according to the invention from a safflower modified alkyd resin and glycidyl methacrylate.

The following materials were charged into a reaction vessel fitted with a stirrer, thermometer and azeotropic distillation condenser:

| | | |
| --- | --- | --- |
| safflower fatty acids | 203.5 | parts |
| glycerol (98% by wt.) | 25.0 | " |
| pentaerythritol | 49.0 | " |
| xylene | 22.0 | " |
| zinc oxide | 0.2 | " |

The ingredients were heated for 1 hour at 210°C, while 13 parts of water were extracted. A further 66.60 parts of phthalic anhydride were added and the reaction continued until 9.5 parts additional water were collected and the acid value dropped to 16.3 mgm.KOH per gm. The batch was then cooled to 150°C, 36.8 parts of phthalic anhydride added and the reaction continued for a further 6 hrs at 160°C, to a final acid value of 46 mgm.KOH per gm and hydroxyl number of 59.

The batch was then cooled to 100°C and the following added

| | | |
| --- | --- | --- |
| xylene | 80.0 | parts |
| glycidyl methacrylate | 33.0 | " |
| Armeen DMCD | 0.3 | " |

The mixture was heated to 120°C and maintained there for 3½ hours at which point it had an acid value of 16. Sixty-two parts of mineral turpentine were then added. The composition had a Gardner-Holt viscosity of Z1 at 71.3% solids by weight.

EXAMPLE 5

Preparation of an autoxidizable film-forming composition according to the invention from a linseed oil alkyd resin and glycidyl methacrylate.

The following materials were charged into a reaction vessel fitted with a stirrer, thermometer and azeotropic distillation condenser:

| | | |
| --- | --- | --- |
| linseed fatty acids | 193.0 | parts |
| glycerol (95% by wt.) | 116.5 | " |
| phthalic anhydride | 160.8 | " |
| zinc oxide | 0.2 | " |
| xylene | 30.0 | " |

Reaction proceeded at 205°C until the acid value of the batch fell to 1.7 mgm. KOH per gm., during which time 34.0 parts of water were collected. A second addition of 59.5 parts of phthalic anhydride was added after cooling to 150°C and reaction continued for 3 hours, when 100 parts of mineral turpentine were added and reaction continued for a further 5 hours at 155°C. The resin so-formed had an acid value of 45 mgm. KOH per gm. and a hydroxyl number of 51.

The batch was cooled for 100°C and the following added:

| | | |
| --- | --- | --- |
| mineral turpentine | 100.0 | parts |
| glycidyl methacrylate | 51.0 | " |
| Armeen DMCD | 0.3 | " |

The mixture was heated to 120°C and maintained there for 2 hours at which point 100 parts of mineral turpentine was added and the mixture held at 120°C for a further 2 hours. Final acid value of the product was 15 mgm. KOH per gm. The resultant composition when diluted with 700 parts of mineral turpentine had a Gardner-Holt viscosity of U and a solids content of 40.5% by weight.

EXAMPLE 6

Preparation of an autoxidisable film-forming composition from a linseed oil alkyd of high hydroxyl number; that is, from a non-preferred autoxidisable material.

The following materials:

| | | |
|---|---|---|
| linseed oil fatty acids | 172.0 | parts |
| glycerol (98% by wt.) | 160.0 | " |
| phthalic anhydride | 109.8 | " |
| zinc oxide | 0.2 | " |
| xylene | 25.0 | " | were charged into a reaction vessel fitted with a stirrer, thermometer and azeotrope condenser. The batch was allowed to react at 205°C until 27 parts of water were collected and the acid value had fallen to 0.9 mgm. KOH per gm. It was then cooled to 150°C, 50.2 parts of phthalic anhydride and 64.5 parts of xylene added and the reaction continued at 160°C until the acid value rose to 43.7 mgm. KOH per gm. The hydroxyl number was then 101 and viscosity. E + ¼ (Gardner-Holt) at 50% by wt. in mineral turpentine.

An addition of 71.0 parts mineral turpentine, 40.6 parts glycidyl methacrylate and 0.4 parts Armeen DMCD was then made to the batch which was reacted for 2 hrs at 115°C to an acid value of 12 mgm. KOH per gm. It was then thinned by the addition of 250 parts of mineral turpentine, to a viscosity of J + ¼ (Gardner Holt) and total solids of 49.4% by wt.

EXAMPLE 7

Preparation of an autoxidizable film-forming composition according to the invention from a safflower oil alkyd.

A reaction vessel fitted with stirrer, thermometer and azeotropic condenser was charged with:

| | | |
|---|---|---|
| dipentaerythritol | 63.5 | parts |
| safflower fatty acids | 280.0 | " |
| zinc oxide | 0.2 | " |
| xylene | 30.0 | " | and esterification allowed to proceed of 205°C to zero acid value, during which time 18.5 parts of water were collected. The batch was cooled to 150°C, 74.0 parts of phthalic anhydride were added and reaction resumed for 4 hrs at 160°C.

| A mixture of | | |
|---|---|---|
| xylene | 167.0 | parts |
| glycidyl methacrylate | 64.0 | " |
| dimethylethanolamine | 0.6 | " | was then added to the batch, which was held at 115°C until an acid value of 13 mgm. KOH per gm., corresponding to a hydroxyl number approaching zero, was obtained. The combined acrylate content of the product was 13.8% by wt.

Similar results were obtained when the preparation was repeated replacing the glycidyl methacrylate on a molar basis by glycidyl acrylate.

EXAMPLE 8

Preparation of an autoxidisable film-forming composition according to the invention from nonpreferred raw materials. The composition is prepared by reacting glycidyl methacrylate with an autoxidizable alkyd resin, which was itself prepared by a one-stage process without a second acid anhydride addition.

900 parts of alkali refined linseed oil were heated to 235°C with 218 parts of glycerol using 0.45 parts of lead as lead naphthenate as catalyst. The mixture was held at 235°C until the product was soluble 1 part in 10 parts of ethanol.

187 parts of glycerol, 805 parts of phthalic anhydride and 100 parts of xylene were added and heated to 210°C and held until the acid value fell to 52 mgm. KOH per gm. The resin was then thinned to 50% solids with mineral turpentine.

The specification of the above alkyd was:

| | |
|---|---|
| Total solids | 50% by wt. |
| Acid value | 52 mgm. KOH per gm. |
| Viscosity | U (Gardner-Holt) |
| Hydroxyl number | 115 (calculated) |

To 800 parts of the above alkyd was added glycidyl methacrylate 40 parts, dimethyl ethanolamine 0.3 parts and hydroquinone 0.13 parts and the mixture heated to 120°C and held for 2 hours. The acid value fell to 23 mgm. KOH per gm. and the viscosity increased to W.

EXAMPLE 9

Preparation of paints from compositions of examples 3 – 8 and their evaluation against "control" paint samples.

A series of paints was made in conventional manner according to the following general formula, using as film-forming component the materials shown in the accompanying table:

| | | |
|---|---|---|
| titanium dioxide | 75.0 | parts |
| film-forming component* | 100.0 | " |
| cobalt naphthenate (3% metal) solution | 4.0 | " |
| mineral turpentine | 8.5 | " |

*commercial linseed oil modified alkyd resin, 50% oil and 50% by weight total solids.

The parts of film-forming component were based on an assumed 50% by wt. total solids and were adjusted on a solids basis to the actual solids of each sample.

The paints were tested according to the general method of example 2, with the following results:

| Film-forming component | Tack-free time: hrs. | Through-dry time: hrs. | Resistant to mineral turpentine: hrs. |
|---|---|---|---|
| Control alkyd* | 6 | 24 | 24 |
| control alkyd plus 10% by wt. glycidyl methacrylate | 7 | 24 | 24 |
| End product of example 3 | 3.4 | 7 | 8 |
| End product of example 4 | 4 | 7 | 8 |
| End product of example 5 | 3 | 10 | 10 |
| End product of example 6 | 5.5 | 8 | 8 |
| End product of example 7 | 6 | 7 | 8 |
| End product of example 8 | 6 | 20 | 24 |

*commercial linseed oil modified alkyd resin, 50% oil and 50% by weight total solids.

These tests show that:
1. The addition of glycidyl methacrylate monomer to a "control" alkyd resin without chemical reaction therewith, slowed the tack-free drying time and made no improvement in the other properties tested for.

2. Paints prepared from film-forming components the sources of which (oil modified alkyd resins) did not conform to our preferred requirements (examples 6–8) had slower tack-free times than the preferred compositions, although in the case of examples 6 and 7 they were superior to the control alkyd. The paint of example 8 was no faster than the "control" in reaching the tack-free state but it did through-dry faster.

We claim:

1. A film-forming composition comprising autoxidizable esterification residues of unsaturated fatty acids and at least one moiety per molecule with a structure of the form:

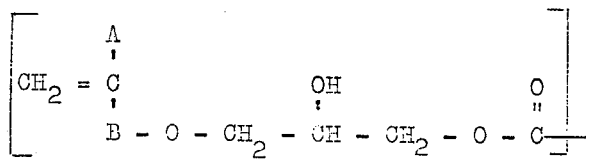

where A is H or $CH_3$
and B is - $CH_2$ - or

2. A film-forming composition according to claim 1 in which the autoxidizable esterification residues of unsaturated fatty acids are provided by a maleinized fatty acid ester of pentaerythritol, dipentaerythritol or tripentaerythritol.

3. A film-forming composition according to claim 2 in which the maleinized fatty acid ester contains 4 – 20% by wt. of combined maleic anhydride.

4. A film-forming composition according to claim 1 in which the autoxidizable esterification residues of unsaturated fatty acids are provided by a drying oil modified alkyd resin.

5. A film-forming composition according to claim 4 in which the alkyd resin has a hydroxyl number of 100 maximum.

6. A process of preparing a film-forming composition according to claim 1 by reacting a drying-oil modified alkyd resin comprising unreacted carboxyl groups with a polymerizable monomer selected from glycidyl acrylate and glycidyl methacrylate, further characterised in that;

a. the alkyd resin is first prepared to an acid value of 20 mgm. KOH per gm. maximum, b. sufficient added acid anhydride is reacted with hydroxyl groups of the above alkyd resin to raise its acid value to at least the stoichiometric amount required to react with the said polymerizable monomer and the hydroxyl number of the alkyd resin reduced to 100 maximum, and c. carboxyl groups of the alkyd resin and epoxide groups of the polymerizable monomer are reacted together at temperatures not exceeding 120°C until the reaction is completed as shown by the fall in acid value.

* * * * *

UNITED STATES PATENT OFFICE
CERTIFICATE OF CORRECTION

Patent No. 3,878,148   Dated April 15, 1975

Inventor(s) John GILLAN et al

It is certified that error appears in the above-identified patent and that said Letters Patent are hereby corrected as shown below:

IN THE HEADING:

Please change the title to read as follows:

[54] FILM-FORMING COMPOSITIONS COMPRISING AUTOXIDIZABLE MATERIAL

Please correct the spelling of the name of the assignee to read:

[73] Assignee: Dulux Australia Ltd., Melbourne, Victoria, Australia

Signed and sealed this 15th day of July 1975.

(SEAL)
Attest:

RUTH C. MASON
Attesting Officer

C. MARSHALL DANN
Commissioner of Patents
and Trademarks